United States Patent

Story et al.

[15] 3,648,722
[45] Mar. 14, 1972

[54] VALVE STRUCTURE ORIENTED FOR FOOLPROOF UNI-DIRECTIONAL INSTALLATION

[72] Inventors: John N. Story, West Seneca; Thomas E. Mayer, Tonawanda; George Yokota, Amherst, all of N.Y.

[73] Assignee: Worthington Corporation, Harrison, N.J.

[22] Filed: Mar. 6, 1970

[21] Appl. No.: 17,164

[52] U.S. Cl. .......................................... 137/454.4, 137/454.2
[51] Int. Cl. ............................................. F16k 51/00
[58] Field of Search ................. 137/525, 454.2, 454.4, 454.5, 137/454.6

[56] References Cited

UNITED STATES PATENTS

| 2,092,088 | 9/1937 | Saharoff | 137/454.4 |
| 3,493,270 | 2/1970 | Doerfler | 137/525 |

Primary Examiner—Robert G. Nilson
Assistant Examiner—William H. Wright
Attorney—Christel & Bean

[57] ABSTRACT

A uni-directional valve body and seat structures for receiving such body in such manner that proper directional orientation of the valve with respect to the seat structure is assured. The valve body has two axially adjacent medial cylindrical portions of different diameters. The larger of the medial cylindrical portions has an adjacent end portion of reduced diameter and the smaller of the medial cylindrical portions has an end portion of reduced diameter which is greater than the reduced diameter of the larger of the medial portions. The apparatus in which the valve body is assembled has internal cylindrical seat means having a larger entry diameter and a smaller coaxial diameter opening extending inwardly therefrom. The larger and smaller diameters in the apparatus match the diameters at either end of the valve body, depending upon the desired direction of orientation of the valve. Due to the diametral relationships of the valve body and the seat portions the wrong end of the valve body cannot be inserted into a given cylindrical seat formation.

9 Claims, 5 Drawing Figures

PATENTED MAR 14 1972

INVENTOR.
JOHN N. STORY
THOMAS E. MAYER
GEORGE YOKOTA
BY Christel & Bean
ATTORNEYS

3,648,722

VALVE STRUCTURE ORIENTED FOR FOOLPROOF UNI-DIRECTIONAL INSTALLATION

BACKGROUND OF THE INVENTION

This invention relates to valve structures and particularly to uni-directional valves which must be installed in such manner that they open and close under pressure influences in predetermined directions.

Valves of the type here under consideration are widely used but an example of one form of apparatus which illustrates the importance of proper orientation of uni-directional valves is in the case of air compressors wherein uni-directional valves are employed at the inlet and discharge sides of the apparatus. The valve at the inlet side must open freely to admit gaseous medium to the compressor and close whenever pressure within the apparatus adjacent to the valve exceeds the pressure at the external side of the valve. On the other hand, the uni-directional valve at the outlet side of the compressor must freely open to discharge the gaseous medium from the compressor and close whenever the external pressure exceeds the pressure within the compressor adjacent to the valve.

If a valve of this type is inadvertently installed in a reverse direction to that intended, the results may not only be harmful and destructive to the apparatus but may cause personal injury or death to those in the vicinity of the apparatus.

One prior art method of attempting to guard against wrongful installation of valves of this type is by providing the valve body with dowel pins and providing openings in the inlet and discharge ports of the apparatus, the dowels of inlet valves being spaced substantially differently from the dowels of outlet valves and the openings in the inlet and discharge ports of the apparatus being located to admit the dowels of the appropriate inlet or discharge valves.

Another technique for avoiding improper installation is to employ valves of radically different size at the inlet and discharge sides of the apparatus. Other than the necessity for insuring against improper installation, the inlet and discharge valves may be substantial duplicates and obvious advantages of mass production, reduced inventory, and the like, are achieved by employing the same valves in the inlet and outlet ends of compressors and analogous apparatus.

SUMMARY OF THE INVENTION

The present invention provides a uni-directional valve structure suitable for installation in either direction, for instance to serve as an inlet or an outlet valve for compressors, with means cooperating with the seat structure of the apparatus to positively prevent installation of the valve so that it operates in the wrong direction.

Speaking generally, this is achieved by providing the exterior cylindrical portion of a valve housing with an inlet end and an outlet end. One of these ends has a major diameter and a minor diameter axially outwardly thereof. The other end of the housing has a major diameter greater than the major diameter of the first end and a minor diameter, axially outwardly thereof, of less diameter than the minor diameter of the first end.

A generally cylindrical internal seat for the first end has major and minor diameters corresponding to the major and minor diameters of that end of the housing plus only very slight necessary clearance. The seat for the other end of the housing likewise has major and minor diameters corresponding to the major and minor diameters of the other end of the housing, again plus necessary clearance for easy installation.

From the foregoing it will be seen that neither end of the valve housing can be inserted into the wrong seat of the housing. In the one case the major diameter will not fit into the major diameter of the seat if the valve is incorrectly oriented. In the other case, the minor diameter of the housing will not fit into the minor diameter of the seat if the valve is not correctly oriented.

From this it will be seen that the diametral differences necessary to insure against improper installation may be very slight and need not be readily observable by the workman. Furthermore, because of the slight diametral difference of the two major diameters, and the slight diametral difference of the two minor diameters, the ledge at each side of the valve housing between its major and minor diameters may be fitted with the same gaskets and such gaskets will seat adequately against the corresponding ledges of either of the valve seats at opposite sides of the apparatus.

DESCRIPTION OF THE PREFERRED EMBODIMENT

Figure 1:
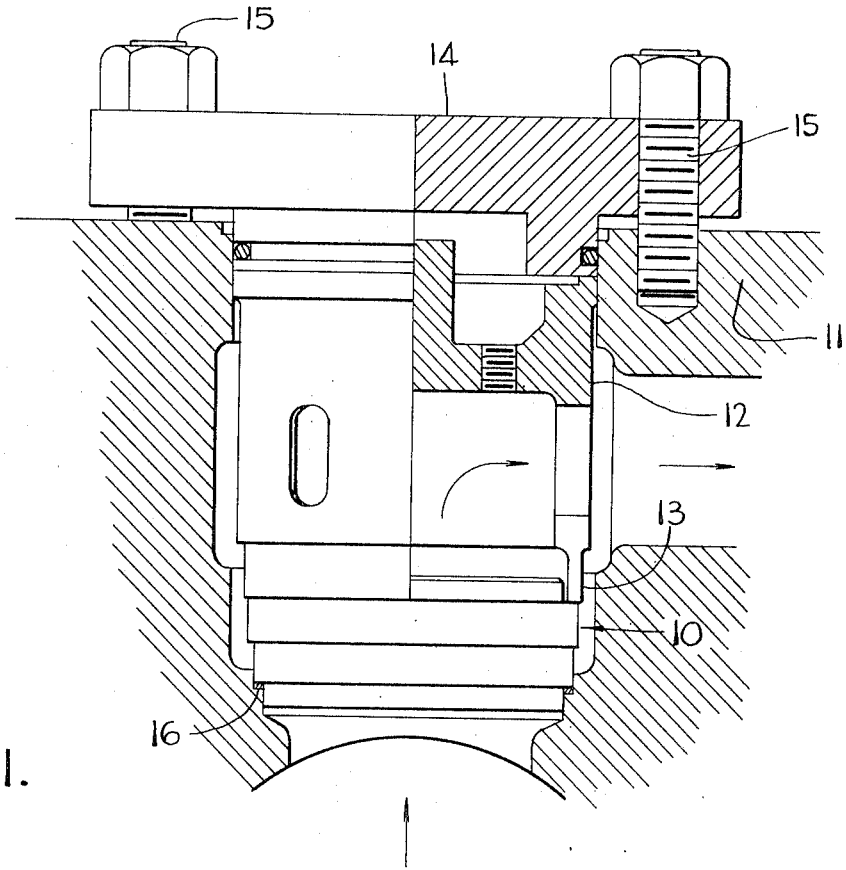
FIG. 1 is a general elevational view, partly in cross section, illustrating a typical installation of one form of the valve of the present invention.

Referring first to FIG. 1, the numeral 10 designates generally a valve body which seats within cylindrical recess portions of a compressor casing 11 or similar apparatus requiring uni-directional valves. In the present instance a generally cylindrical yoke member 12 is assembled over valve 10 and has a skirt portion 13 bearing against the valve body to retain the same in assembled position. In the structure shown in FIG. 1 a valve cover 14 bears against the outer end of valve yoke 12 and is held in assembled position and in clamping relation with respect to yoke 12 and valve body 10 by means of screw or stud devices as indicated at 15 in FIG. 1.

In FIG. 1 the numeral 16 designates an annular gasket which is interposed between a ledge on valve body 10 and a complementary ledge in the cylindrical recesses in casing 11. Further reference to gasket 16 will be had later herein.

Figure 2:
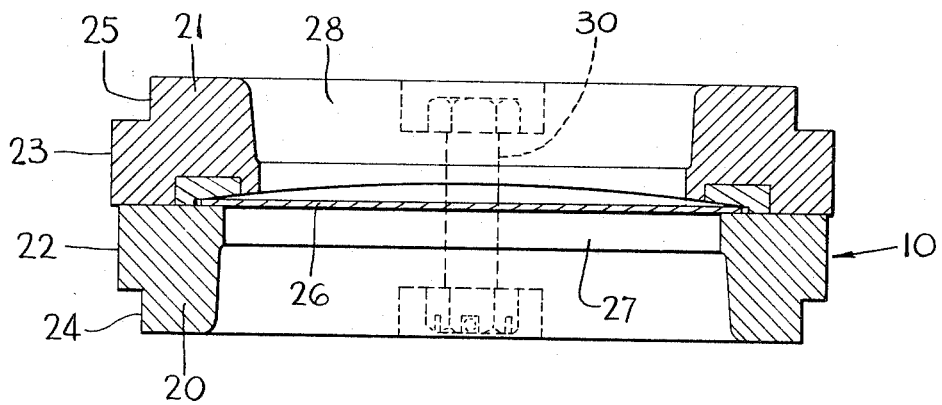
FIG. 2 is a cross-sectional view showing the internal construction of one form of uni-directional valve which may be employed in practicing the present invention.

FIG. 2 shows a typical uni-directional valve of the strip or feather type which may be employed in carrying out the present invention. The strip valve of FIG. 2 is illustrated merely by way of example and various uni-directional valves may be employed in accordance with the principles of the present invention. In FIG. 2 the numeral 20 designates a conventional seat member of a strip valve and the numeral 21 designates a complementary guard member. It will be noted that the periphery 22 of seat member 20 is of less diameter then the periphery 23 of guard member 21. The relationship of these diameters and their cooperation in the present invention will be further explained later herein.

Seat member 20 has a reduced diameter end portion 24 and guard member 21 has a reduced diameter end portion 25. As is conventional in strip or feather valves, a valve strip 26 is retained between seat member 20 and guard member 21 and seats against a port 27 in seat member 20. Valve strip 26 bows upwardly to open under pressure in passage 27 exceeding the pressure in passage 28 of guard member 21. For convenience, the lower side of the valve assembly of FIG. 2, that is the seat member 20, may be referred to as the discharge side of the valve and the upper end, that is the guard member 21, may be referred to as the suction side. This means that the lower end of the valve assembly will be connected to the discharge passage of a compressor, for instance, while the upper end will be connected to the suction side of a compressor. The seat and guard members 20 and 21 are held in unitary assembly by means of bolts 30.

Figure 4:
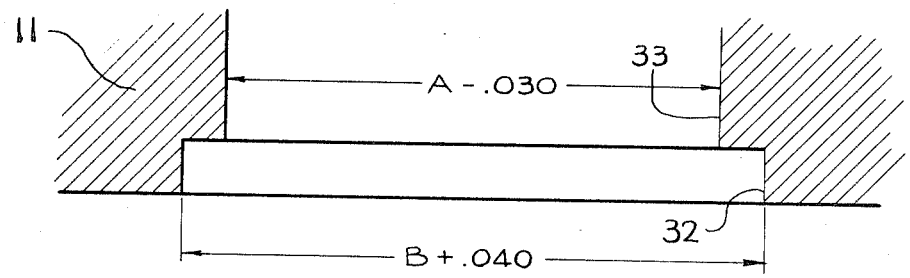
FIG. 4 is a fragmentary cross-sectional view of a seat portion of apparatus in which the valve body of FIG. 3 is to be assembled for operation in one direction.
Figure 3:
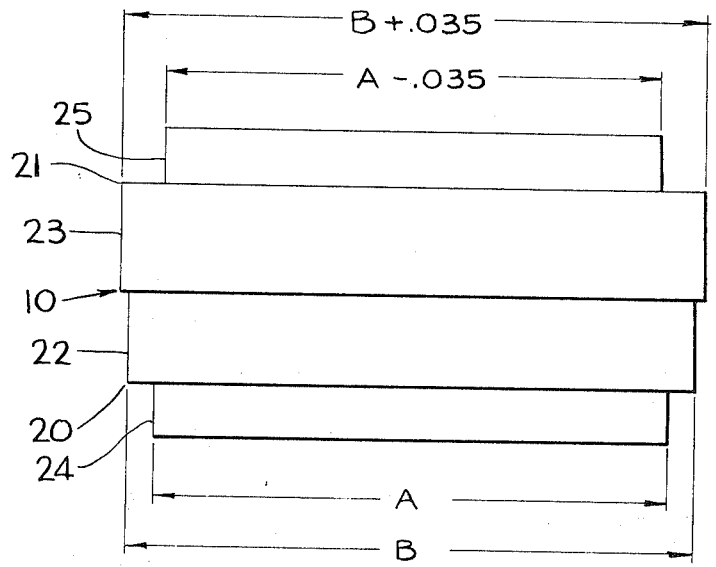
FIG. 3 is an elevational view of the valve body shown in FIG. 1.
Figure 5:
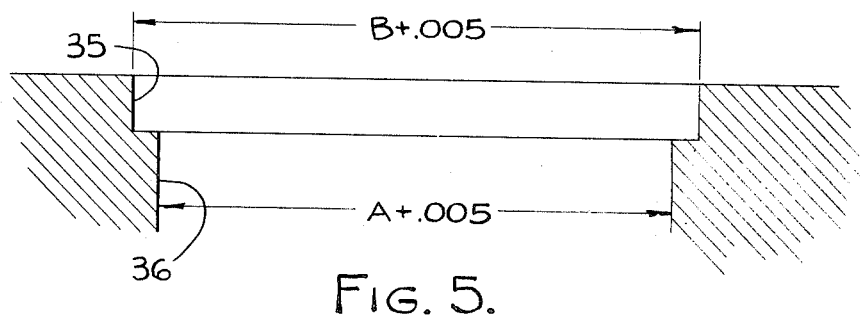
FIG. 5 is a fragmentary cross-sectional view of another seat portion of apparatus in which the valve body of the present invention is to be assembled for service in the opposite direction.

Reference will now be had to FIGS. 3, 4 and 5 which show somewhat schematically the relationship between valve body 10 and the cylindrical seats which receive the same for operation in one direction or the other. In the present instance it will be noted from the relative dimensions applied to valve body 10 in FIG. 3 that guard 21 is of slightly greater outside diameter than seat 20, and the reduced portion 25 of guard 21 is of slightly less diameter than the reduced portion 24 of seat 20.

It will further be noted that the larger cylindrical recess portion 32 in the suction side of compressor 11 is just sufficiently larger than the diameter of periphery 23 of the guard member to provide clearance for assembly and the lesser diameter portion 33 of the cylindrical recess of the suction side of compressor 11 is just sufficiently larger than the reduced end portion 25 of the guard member 21 to permit ready assembly. The larger and smaller diameter recess portions 35 and 36 at the discharge side of compressor 11 are likewise proportioned to receive seat 20 and reduced end portion 24 thereof with only sufficient clearance for convenient assembly.

The foregoing valve body structure and the related suction and discharge passage recesses in compressor casing 11 are thus proportioned as to diameters in such a way that the guard end of the valve body can only be assembled in the suction side of the compressor and the seat portion of the valve body can only be assembled in the discharge side of compressor 11.

If the valve body of FIG. 3 be reversed end for end and it be attempted to assemble the guard end of the valve body in the discharge side recess of compressor 11, the diameter of periphery 23 of the guard member will not enter cylindrical recess portion 35. Conversely, if it be attempted to assemble the seat portion of valve body 10 in the suction side recess of compressor 11 shown in FIG. 4, the reduced end diameter 24 of the seat portion of valve body 10 will not fit into the reduced opening 33 of the suction side.

From the foregoing it will be seen that an absolutely foolproof provision is made against improper assembly, that is, reverse assembly, without complicating the valve body structure and without resorting to extreme size differentials or the like.

Furthermore, the diametral relationships of the four diameter portions of valve body 10 are such that the same gasket devices may be used at either the discharge side or the suction side of compressor 11.

The annular gasket designated 16 in FIG. 1 may have an inside diameter approximately equal to the outside diameter of the reduced end portion 24 of seat member 20 and an outside diameter approximating the external diameter of periphery 22 of the seat member. This gasket may then be used at such discharge side of the compressor or at the suction side. In the latter case the gasket will merely have slightly greater internal and external clearances with respect to reduced portion 25 and opening 32, respectively.

It will be noted that the advantages of the present invention are achieved, in the embodiment illustrated and described herein, without any extra manufacturing operations whatsoever. The outside diameter of the guard is merely turned to a slightly greater outside diameter than the seat, and the reduced portions of these members are present, in any event, to provide ledges for receiving a gasket and for receiving the clamping portion of the yoke. The suction and discharge passages of the apparatus are likewise conventionally formed with gasket receiving ledges as illustrated and described herein.

What is claimed is:

1. A uni-directional valve body having a pair of stepped end to end generally cylindrical portions and adapted to pass fluid therethrough in one generally axial direction and close against fluid flow in the opposite direction, the outside diameter of one of said portions being greater than the outside diameter of the other, said valve body having cylindrical end portions of reduced diameter with respect to said outside diameter portions, the diameter of the end portion adjacent to said larger outside diameter cylindrical portion being less than the diameter of the end portion adjacent to said smaller outside diameter cylindrical portion.

2. The valve body of claim 1 in combination with apparatus having inlet and discharge passages, each having larger diameter entry portions and smaller diameter portions axially inwardly of said entry portions, one of said passages having an entry portion and a smaller diameter portion of a size to receive the outside and reduced diameters of one of said portions of said valve body and the other of said passages having entry and small diameter portions to receive the outside and reduced diameters of the other of said valve body portions.

3. A valve body according to claim 1 wherein the difference between the two outside diameters and the difference between the two reduced diameters is of the general order of 0.035 inches.

4. Apparatus according to claim 2 wherein the difference between the two outside diameters and the difference between the two reduced diameters is of the general order of 0.035 inches.

5. A valve body according to claim 1 wherein the juncture of each outside diameter of said valve body with its associated reduced diameter end portion provides a ledge for receiving an annular gasket.

6. The valve body of claim 5 in combination with apparatus having inlet and discharge passages, each having larger diameter entry portions and smaller diameter portions axially inwardly of said entry portions, one of said passages having an entry portion and a smaller diameter portion of a size to receive the outside and reduced diameters of one of said portions of said valve body and the other of said passages having entry and small diameter portions to receive the outside and reduced diameters of the other of said valve body portions.

7. Apparatus according to claim 6 including means for retaining said valve body selectively in either of said passages with the ledge portion thereof directed toward the corresponding ledge portion formed at the juncture of the entry portion and smaller diameter portion of said passage, and an annular gasket disposed between said opposed ledges.

8. A valve body according to claim 1 wherein the differences between the two outside diameters thereof and the two reduced diameters thereof are sufficiently small to permit the same annular gasket to be interchangeably disposed against either ledge.

9. Apparatus according to claim 4 including an annular gasket adapted to be disposed against the juncture of the larger diameter entry portion and the smaller diameter portion of either of said passages, with the corresponding portion of said valve body seating against said gasket, and means for retaining said valve body axially against said gasket.

* * * * *